US 8,260,908 B2

(12) United States Patent
Chang et al.

(10) Patent No.: US 8,260,908 B2
(45) Date of Patent: Sep. 4, 2012

(54) TECHNIQUES FOR SEQUENCING SYSTEM LOG MESSAGES

(75) Inventors: Steve Chen-Lin Chang, Cupertino, CA (US); L. Alexander Clemm, Los Gatos, CA (US); Petre Dini, San Jose, CA (US); Shyyunn Sheran Lin, San Jose, CA (US)

(73) Assignee: Cisco Technologies, Inc., San Jose, CA (US)

( * ) Notice: Subject to any disclaimer, the term of this patent is extended or adjusted under 35 U.S.C. 154(b) by 1340 days.

(21) Appl. No.: 11/280,539

(22) Filed: Nov. 16, 2005

(65) Prior Publication Data

US 2007/0110070 A1  May 17, 2007

(51) Int. Cl.
*G06F 15/173* (2006.01)
(52) U.S. Cl. ....................................................... 709/224
(58) Field of Classification Search .................... 709/224
See application file for complete search history.

(56) References Cited

U.S. PATENT DOCUMENTS

| | | | | |
|---|---|---|---|---|
| 6,009,177 A * | 12/1999 | Sudia | ........................ | 713/191 |
| 6,697,851 B1 * | 2/2004 | Althaus et al. | ................ | 709/220 |
| 7,225,249 B1 * | 5/2007 | Barry et al. | ................... | 709/227 |
| 7,295,511 B2 * | 11/2007 | Sharma et al. | ................ | 370/217 |
| 7,428,756 B2 * | 9/2008 | Wookey | ........................ | 726/26 |
| 7,430,671 B2 * | 9/2008 | Graves et al. | ................ | 713/193 |
| 7,464,162 B2 * | 12/2008 | Chan | ............................. | 709/225 |
| 7,483,883 B2 * | 1/2009 | Barth et al. | ........................ | 1/1 |
| 7,668,811 B2 * | 2/2010 | Janssens et al. | ........ | 707/999.003 |
| 2001/0050990 A1 * | 12/2001 | Sudia | ........................... | 380/286 |
| 2004/0031030 A1 * | 2/2004 | Kidder et al. | ................... | 717/172 |
| 2004/0103165 A1 * | 5/2004 | Nixon et al. | ................... | 709/217 |
| 2004/0168100 A1 * | 8/2004 | Thottan et al. | .................... | 714/4 |
| 2004/0193964 A1 * | 9/2004 | Robinson et al. | ............... | 714/48 |
| 2005/0018651 A1 * | 1/2005 | Yan et al. | ....................... | 370/352 |
| 2005/0216421 A1 * | 9/2005 | Barry et al. | ..................... | 705/64 |
| 2005/0223222 A1 * | 10/2005 | Graves et al. | ................. | 713/165 |
| 2006/0218629 A1 * | 9/2006 | Pearson et al. | ..................... | 726/8 |
| 2006/0271826 A1 * | 11/2006 | Desai et al. | ....................... | 714/38 |
| 2007/0011485 A1 * | 1/2007 | Oberlin et al. | ..................... | 714/4 |
| 2007/0110070 A1 * | 5/2007 | Chang et al. | .................. | 370/394 |
| 2007/0234428 A1 * | 10/2007 | Rash | ................................ | 726/25 |
| 2008/0104094 A1 * | 5/2008 | Cowham et al. | ............. | 707/101 |
| 2008/0126795 A1 * | 5/2008 | Miao | ............................. | 713/151 |
| 2009/0106433 A1 * | 4/2009 | Knouse et al. | ................ | 709/229 |
| 2009/0254973 A1 * | 10/2009 | Kwan | ............................... | 726/2 |

\* cited by examiner

*Primary Examiner* — Jerry Dennison
(74) *Attorney, Agent, or Firm* — Schwegman, Lundberg & Woessner, P.A.

(57) ABSTRACT

Techniques for system (syslog) messages are provided. As syslog messages are generated a dual sequence number is maintained for each syslog message. The first sequence number is consistent for each syslog message and represents a total number of syslog messages received. The second sequence number is maintained as a total message count for a specific session for which a syslog message is assigned.

19 Claims, 3 Drawing Sheets

TECHNIQUES FOR SEQUENCING SYSTEM LOG MESSAGES

FIELD

The invention relates generally to network communications particularly to techniques for sequencing system log messages.

BACKGROUND

System logging (syslog) is a widely used mechanism for remotely sending notification "log" messages from a device to a receiver. The receiver is a logging host and/or management application. Syslog messaging is inherently unreliable because it is cumbersome and difficult for the logging host and/or management application to be assured that it is getting the messages it needs and at the same time not getting inundated with messages that it does not need, which may adversely impact performance of the logging host and/or management application or the device associated with the logging host and/or management application.

To address the issue of receiving only desired messages, a number of techniques have been attempted in the industry. For example, a sequence number is may be added to each syslog message to uniquely identify each syslog message. Sequence numbers permit receiving applications to detect whether messages are lost by detecting sequence number gaps between different syslog messages. A sequence number also permits an application to uniquely identify a particular syslog message across multiple applications; this can be useful if multiple applications compare and merge their logs to create a single non-duplicated log.

Another technique for improving the accuracy of receiving only desired messages is to have the sender of the syslog messages enforce rate limiting or enforce message filtering. With rate limiting, if a rate limit for receiving messages is exceeded, then messages are either queued or dropped altogether. This is done to avoid swamping the receiver, which may cause messages to be dropped anyway by the device associated with the receiver. Similarly, messages may be weeded out such that only messages of interest to an application are sent to the application. In this manner, the quality and quantity of messages may be somewhat controlled by the receivers or applications.

However, in most cases a sender of the syslog messages is delivering syslog messages to multiple receivers where some receivers are enforcing rate limits or filters that are different from the other receivers. Thus, because different messages get dropped for different receivers problems can arise. Specifically, gaps in sequence numbers for received messages may not be definitively identified as problematic because receivers are unable to distinguish whether the gaps are legitimate because of rate limiting or filtering or whether the gaps are in fact problematic because of lost messages that are not properly received from the sender.

Furthermore, if an attempt is made to number syslog messages based on an identity of the receiver in order to alleviate the problem of detecting legitimate from problematic gaps in syslog message numbering, then this creates other problems. For example, if the syslog messages are uniquely numbered for a specific receiver and not globally across all receivers, then multiple receivers can not merge their logs with one another because the uniqueness of a single syslog message across multiple receivers is lost or is undetectable to the receivers.

Therefore, improved syslog message sequencing techniques are desirable.

DETAILED DESCRIPTION

Figure 1:
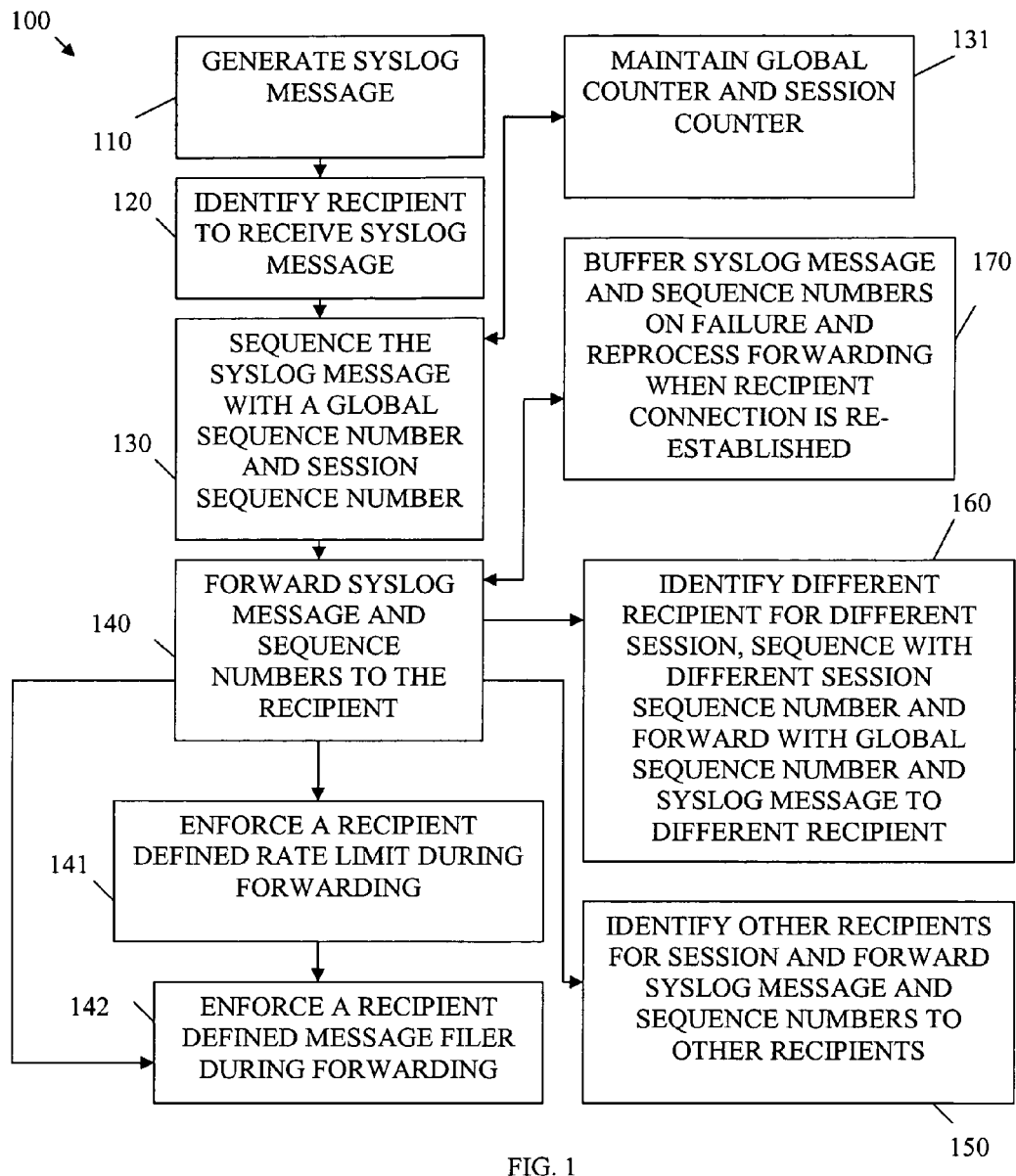
FIG. 1 is a diagram of a method for sequencing system (syslog) messages, according to an example embodiment.

FIG. 1 is a diagram of a method 100 for sequencing system (syslog) messages, according to an example embodiment. The method 100 (hereinafter "sequencing service") is implemented in a non-transitory machine-accessible and readable medium and is operational over a network. The network may be wired, wireless, or a combination of wired and wireless. In an embodiment, the sequencing service is integrated within a network router or other network device.

As used herein the terms "recipient," "receiver," and "sender" may used interchangeably and synonymously. These terms refer to an application or external service that is configured or registered to receive syslog messages from the sequencing service. The sequencing service may generate or trap the syslog messages. That is the syslog messages may be produced by the sequencing service or produced by other services or application and detected and trapped by the sequencing service.

A "session" refers to a connection between the sequencing service and one or more recipients during which syslog messages are sent to the one or more recipients. In some cases, rate limiting or message filtering may be applied on a session configured basis. A session may be viewed as the sequencing of syslog messages, which are sent over a same transport connection to same recipient(s), and for which a same rate limit or filter may be in effect. A session may exist for a single recipient or for multiple recipients. Moreover, a session may exist over a single transport connection or communication channel or over multiple different communication channels. Configuration information for a given session may be managed via policy or other metadata by the sequencing service when delivering the syslog messages to the recipients over the sessions. Each session is unique and maintained as a unique logical connection between the sequencing service and one or more recipients over one or more communication channels.

At 110, the sequencing service generates or detects a syslog message. For example, the sequencing service may detect that a connection attempt is being made from one Internet Protocol (IP) Address to another IP address. A policy may dictate that this activity be represented as data or information in a syslog message. The sequencing service may also classify the activity or syslog message into one or more categories based on the detected activity. Alternatively, the syslog message itself may include a category or classification and may have been produced or communicated from a different service or application to the sequencing service.

At 120, the sequencing service identifies a recipient that is to receive the syslog message. Again, this can be done in a variety of manners. For example, an identity of the recipient may be maintained by the sequencing service as receiving syslog messages of a certain type, category, and/or classification. Also, the recipient may be associated with a given session identifier, such that any syslog message received is communicated it associated with that session. Still further, an identity associated with a producer of a syslog message may be associated with an identity of the recipient, such that any syslog message produced by the producer is to be sent to the corresponding recipient. In fact, a variety of other techniques may be used to identify and associated a particular syslog message with a given recipient. All such techniques are intended to fall within the teachings and embodiments presented herein.

When the syslog message is generated or detected, the sequencing service increments a global sequence number. The global sequence number may be represented as a positive integer value, which represents a current total count for every syslog message received or generated by the sequencing service. Additionally, the global sequence number is unique for each different syslog message. In a sense, the global sequence number is an identifier for the generated or received syslog message. Accordingly, any type of unique identifying labeling scheme may be used for the global sequence number, which is assigned to each generated or received syslog message.

It is to be noted that since the global sequence number serves as a unique identifier for each syslog message, the global sequence number may be assigned at any configurable processing point desired by the sequencing service. That is, the global sequence number may be assigned as soon as a syslog message is detected or generated. Alternatively, the global sequence number may be assigned after the sequencing service performs its own global filtering, or after the syslog message is actually associated with a given session and/or recipient. In other words, the order with which the processing of the sequencing service assigns the global sequencing number to a syslog message can vary.

Once the syslog message is associated with the recipient and has a global sequence number, the sequencing service associates the syslog message and/or recipient with a particular session identifier for a session. In some cases, the syslog message is associated with a session via a classification or via policies before it is assigned or associated with a particular recipient. That is, the association of the syslog message with a particular session may provide the additional association to the appropriate recipient.

At 130, the sequencing service sequences the syslog message with the global sequence number and with a session sequence number. The session sequence number is specific to the session identifier being maintained by the sequencing service for the session.

It should also be noted that the processing of 130 may be separated into two discreet processes, one for producing the global sequence number for the message and one for producing the session sequence number. These two numbers are generated independent of one another. The global sequence number is produced and then sessions are independently determined that determine the session sequence number and where the message will be sent. The session sequence number is inserted when the message is sent over a specific session.

The sequencing provides a two-numbering or dual-identification scheme for the syslog message being processed. The syslog message receives an absolute identifier via its assigned global sequence number. Simultaneously, the syslog message receives a relative identifier via its assigned session sequence number.

For example, consider a device that generates 7 syslog messages for which message number 2 is dropped due to global filtering and message number 5 is dropped due to global rate limiting on the device. The sequencing service receives, generates, or traps the messages from or on the device. The dual-sequencing number for the retained syslog messages may appear as follows for a given session that the syslog messages are associated: (1, 1); (3, 2); (4, 3); (6, 4); and (7, 5). The first part of the tuples is the global sequence number for which it can be discerned that syslog messages 2 and 5 were dropped. The second part of the tuples is the session-specific sequence number for which it can be seen that there is an ordered and uninterrupted sequence beginning at 1 and continuing to 5.

It should be noted in the example that the values for the session sequence number do not have to be serial integer numbers; rather, the values can be characters and/or numbers that reflect a relative value that is relative to the global sequence number. Thus, in the prior example the session sequence number may have alternatively appeared in the tuples as follows: (1, -); (3, 1); (4, 3); (6, 4); and (7, 6). The "-" indicates that the global sequence number and the session sequence number are one and the same. The "1" in (3, 1) indicates the global sequence number for a message that was previously sent. In this manner, a recipient can tell that no messages are lost during the session since with each session sequence number it is determined that an immediately previous received message was processed. Other techniques may be used, such that the session sequence number is unique to the session and relative to the global sequence number. All such techniques are intended to fall within the scope of the teachings and embodiments presented herein.

According to an embodiment, at 131, the sequencing service may maintain a global counter for purposes of assigning the global sequence number to the syslog messages and simultaneously maintain a session counter for purposes of assigning the session sequence number. These counters may be retained in storage, memory, and/or one or more registers associated with the device that processes the sequencing service.

At 140, the sequencing service forwards the syslog message being processed along to the recipient to whom it is associated along with both the global sequence number and the session sequence number. The global and session sequence numbers represent metadata associated with the syslog message. The metadata may be embedded in the syslog message as a header or may be carried in a separate data structure associated with the syslog message.

According to an embodiment, at 141, the sequencing service may enforce recipient defined rate limits during the forwarding process for the recipient. Policy may dictate whether any syslog messages that are subject to the rate limits are buffered and subsequently delivered to the recipient or whether the syslog messages affected are dropped altogether and never delivered to the recipient. Moreover, the rate limit may be used to alter the session sequence number so as to not include any intentionally dropped syslog messages.

In still another embodiment, at 142, the sequencing service may enforce recipient defined message filtering during the forwarding process for the recipient. Again, policy may dictate whether filtered messages are reported to the recipient and whether the filtered messages are used to adjust the session sequence number so to the recipient it appears that no gap exists with legitimately filtered syslog messages.

In some cases, at 150, the sequencing service may identity multiple other recipients that are associated with the same session as the recipient. In such a case, the syslog message along with the global sequence number and the session sequence number are sent to each of the other recipients associated with the session. Thus, under some circumstances the sequencing service may broadcast a single syslog message and its dual-sequence numbers over a network to selective recipients that are assigned to a given session. It is also to be noted, that the transport connection or communication channel may be the same for a given session or the given session may have multiple different transport connections or communication channels being used by the various recipients registered to the session.

In yet another embodiment, at 160, the sequencing service may identify the syslog message as being associated with a different recipient and an entirely different session or session identifier. Here, a same syslog message is replicated for purposes of communicating it to two different recipients associated with two different sessions. Accordingly, a different sequencing occurs for a different session sequence number that is unique to the different session. The syslog message, the same global sequence number, and the different session sequence number are then forwarded to the different recipient that is associated with the different session. It is noted that although a single different session and recipient was illustrated that the number of possible different sessions and recipients is unbounded.

According to an embodiment, at 170, the sequencing service may detect when a connection failure occurs with a given session or given recipient of a session. In such a situation, the sequencing service may buffer the syslog message, the then-existing global sequence number, and the then-existing session sequence number and re-process the forwarding to the recipient once the connection to the recipient is re-established. Thus, failover techniques may augment the processing of the sequencing service to improve syslog message deliveries to recipients. However, in some cases such an arrangement may not be desirable given the volume potential of syslog messages for a given recipient. Therefore, failover and error recovery techniques are optional and configurable.

It is now understood how a sequencing service may deploy a dual sequencing technique for syslog messages that provides the ability to retain existing unique identification of any given syslog message and provides the ability for a recipient to identify and distinguish between legitimate and problematic message drops.

Figure 2:
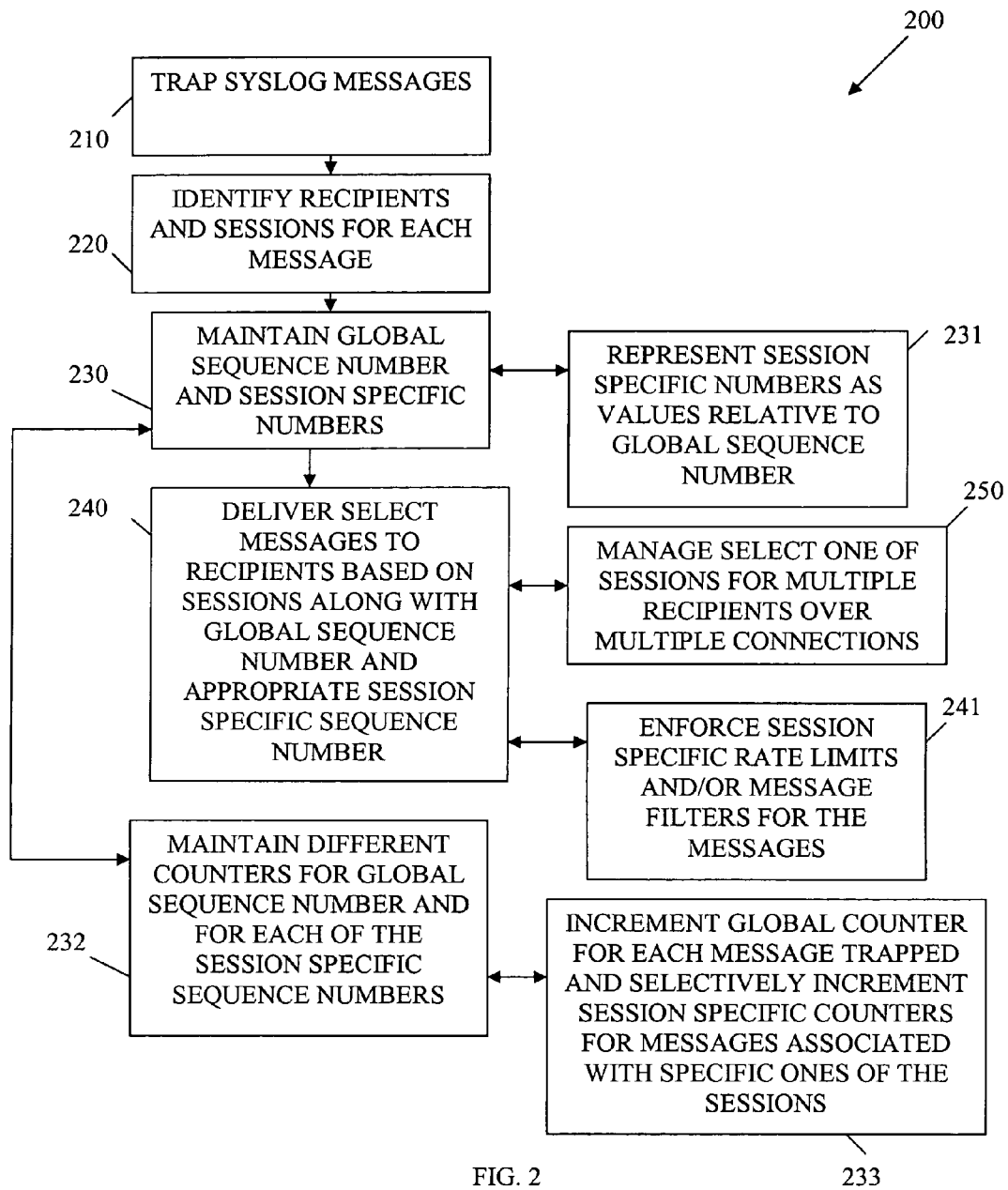
FIG. 2 is a diagram of another method for sequencing syslog messages, according to an example embodiment.

FIG. 2 is a diagram of another method 200 for sequencing syslog messages, according to an example embodiment. The method 200 is implemented as instructions within a non-transitory machine-accessible and readable medium. The instructions when loaded, accessed, and processed by a machine perform the processing depicted in FIG. 2. The processing presents a different perspective to the method 100 of FIG. 1.

The instructions may be implemented within a removable medium that when interfaced to a machine are uploaded and processed by that machine. Alternatively, the instructions may be downloaded from one network machine to another network machine where they are processed. In still other situations, the instructions are prefabricated within the hardware and/or firmware of the machine and/or available from memory and or storage associated with the machine for processing. According to an embodiment, the instructions loaded and installed within a network routing device. However, it is to be understood that other devices may install and process the instructions and the embodiments presented herein are not exclusively limited to routing devices.

At 210, the instructions trap syslog messages. In some cases, the instructions may generate a number of the syslog messages. In other situations, the instructions may receive the syslog messages from other applications or services that produce them. The instructions may also inspect the syslog messages and other information about the syslog messages (e.g., metadata, identity of resource that produced a message, etc.) for purposes of associating the messages to categories, classifications, sessions, recipients, etc. Policies, lookup tables, or other mechanisms may provide the associations to the instructions.

Accordingly, at 220, recipients and sessions are identified for each syslog message trapped. A single message can be associated with multiple sessions. Furthermore, a single recipient can be associated with multiple different sessions. Identities of recipients may be obtained from the sessions to which they belong. Moreover, configurations and policies may be associated on a per session basis or a per recipient basis.

At 230, the instructions maintain a global sequence number and session specific numbers. The global sequence number is incremented with each message received and assigned to that message. Thus, the value of the global sequence number for any particular message is the then-existing total count of the messages received and processed by the instructions. There are multiple session specific numbers. Each different session specific number corresponds to a specific session or session identifier and works in a manner similar to the global sequence number, except that the specific session number is incremented if a message is designated or identified as being associated with that specific session. Thus, if 3 messages are received and the messages are associated with sessions A and B. The global sequence number for the first message that is associated with the session A and assigned to recipient X may be (1, 1). The second message may be associated with session B and assigned to recipient Y and may be (2, 1). Finally, the third message may be associated with session A again and appear as (3, 2). The second portion of the tuple for the third message illustrates the use of the session specific number for the session A.

According to an embodiment, at 231, the session specific numbers may be represented as values that are relative to a global sequence number. An example of this scenario was discussed above with the method 100 of FIG. 1. For instance, the session specific number may be a number representing the immediately preceding global sequence number transmitted for the given session.

In an embodiment, at 232, the instructions may maintain in memory, storage, and/or registers different counters for the global sequence number and for each of the session specific numbers. The current value for the counters when any given message is being processed is assigned and associated with that message to represent that message's global sequence number and session specific number. Again, at 233, the global counter is incremented for each new message processed by the instructions while the session specific counters are incremented only when a message associated with a given session for a given session specific counter is encountered.

At 240, the instructions deliver select ones of the messages to recipients based on or in response to the sessions. The select messages also include the global sequence number and the appropriate session specific number that is associated with the given session to which the select messages belong. That is, if a message belongs to session A, then recipients associated with session A receive the message and receive the global sequence number and a session specific number that is exclusively associated with messages being sent via session A.

In an embodiment, at 241, the instructions may also enforce specific rate limits and/or message filters for the messages. The rate limits and message filters may be global to the instructions, specific to a given session, specific to a given message, and/or specific to a given recipient that is associated with one or more sessions. Any messages not delivered may or may not be used to alter the session specific numbers so that it appears to a recipient that no gap was produced in delivering messages for a given session. This may be done because the rate limit and/or filter is presumed to be legitimate and non problematic so there may be no desire on the part of the recipient to know that the rate limit or message filter prevent a certain message from reaching the recipient via a given session.

In still another embodiment, at 250, the instructions may manage a select one of the sessions across multiple recipients over multiple connections. The connections may or may not be the same communication channel. Also, a single message may be managed and distributed over multiple different sessions; in such a case, each version of the single message includes a different session specific number indicative of its session specific activity.

Figure 3:
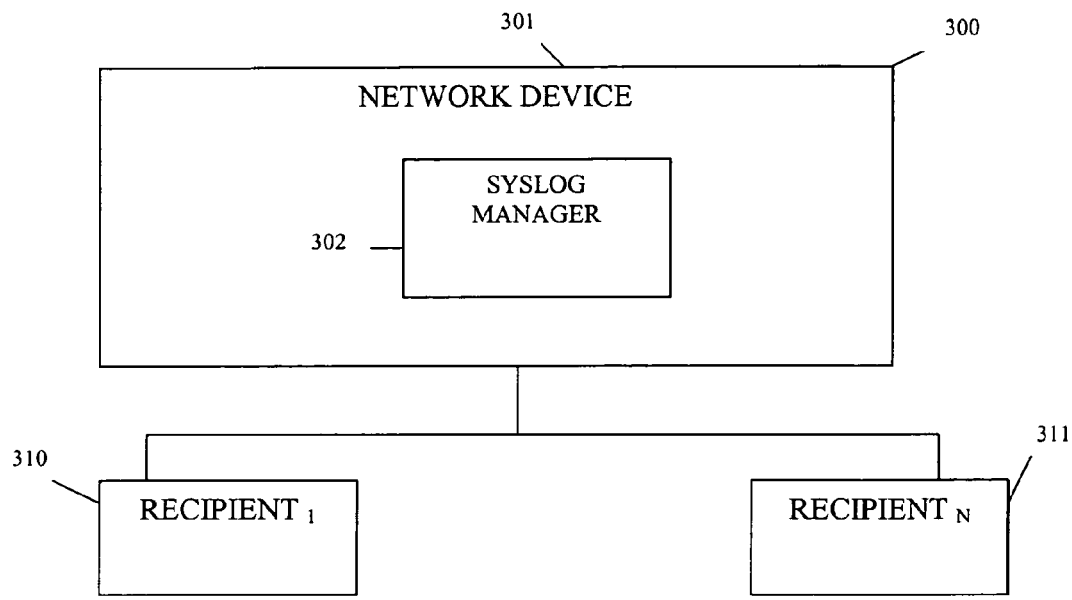
FIG. 3 is a diagram of a syslog sequencing apparatus, according to an example embodiment.

FIG. 3 is a diagram of a syslog sequencing apparatus 300, according to an example embodiment. The syslog sequencing apparatus 300 is implemented within a non-transitory machine-accessible and readable media of a machine. In an embodiment, the syslog sequencing apparatus 300 implements, among other things, the methods 100 and 200 of the FIGS. 1 and 2, respectively.

The syslog sequencing apparatus 300 includes a network device 301 and a syslog manager 302. The syslog sequencing apparatus 300 interacts with a plurality of recipients 310-311.

The network device 301 processes the syslog manager 302 and is connected to a network. The network device 301 is enabled to communicate over the network with recipients 310-311 via a variety of communication channels or transport connections. The network may be wired, wireless, or a combination of wired and wireless. In an embodiment, the network device 301 is a network router that routes traffic within some portions of the network.

The syslog manager 302 processes on the network device 301 or within the local environment of the network device 301. The syslog manager 302 detects, generates, and/or traps syslog messages. The messages are subscribed to by the recipients 310-311. Furthermore, the messages are classified or otherwise associated with categories, sessions, and/or the recipients 310-311. In an embodiment, the syslog manager 302 implements the processing of the method 100 and 200 of FIGS. 1 and 2, respectively.

The syslog manager 302 associates a message with one or more sessions. Each session is also associated with one or more of the recipients 310-311. Each message also receives from the syslog manager 302 a global sequence number that acts as a syslog message identifier across all the session and each message receives a session specific sequence number for the session to which it is associated. The syslog manager also delivers the syslog message, global sequence number, and session specific sequence number to the recipients 310-311 assigned to the session, which is associated with the syslog message being processed.

In an embodiment, the syslog manager 302 enforces rate limiting and/or message filtering. The rate limiting and filtering may occur on a global level across all session, may occur on a per session basis, may occur on a per message basis, and/or may occur on a recipient 310 or 311 basis.

According to an embodiment, the syslog manager 302 may also perform a variety of error handling or failover techniques. For example, the syslog manager 302 may buffer syslog messages, the assigned global sequence numbers associated with the buffered syslog messages, and the assigned session specific sequence for subsequent or delayed deliver to selective recipients 310-311 if a connection failure or delivery failure occurs. The delivery subsequently occurs if a connection is re-established with the selective recipients 310-311.

In some embodiments, the syslog manager 302 can maintain the session specific sequence numbers as values that are relative to the assigned global sequence number. That is, the session specific sequence number does not have to be a serially produced number within a given session; rather it can be a last-received global sequence number received within that given session.

In yet another embodiment, the syslog manager 302 may maintain one of the sessions for multiple ones of the recipients 310-311 over multiple different transport connections or multiple different communication channels.

Figure 4:
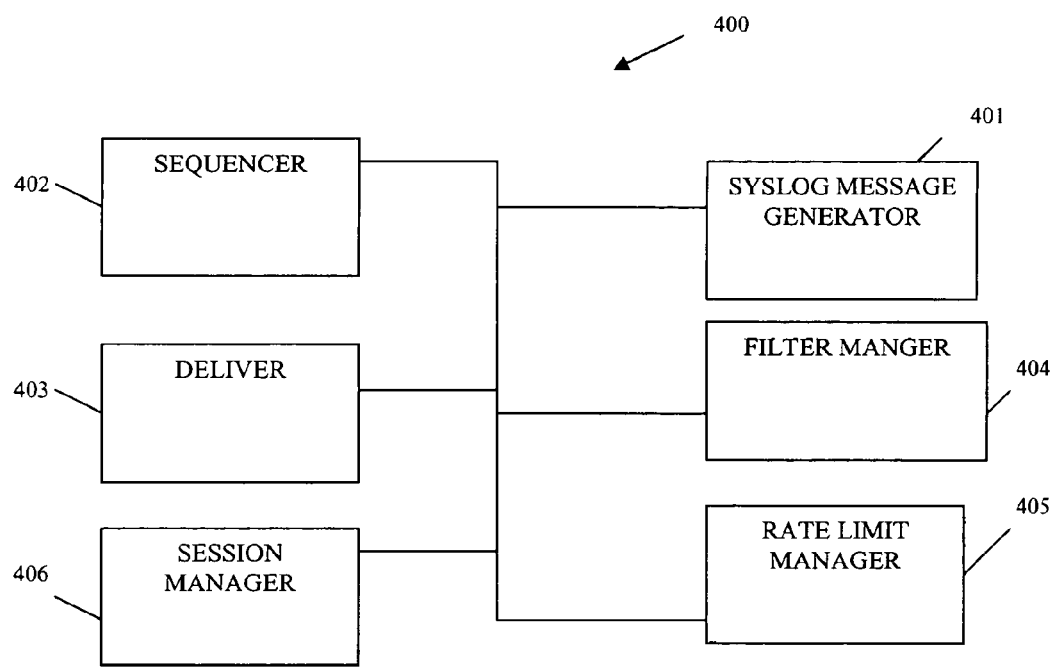
FIG. 4 is a diagram of syslog sequencing system, according to an example embodiment.

FIG. 4 is a diagram of syslog sequencing system 400, according to an example embodiment. The syslog sequencing system 400 is implemented in a non-transitory machine-accessible and readable medium and is accessible over a network. The network may be wired, wireless, or a combination of wired and wireless.

The syslog sequencing system 400 includes a syslog message generator 401 and a sequencer 402. The syslog sequencing system 400 may also include a deliver 403, a filter manager 404, a rate limit manager 405, and/or a session manager 406. Each of these will now be discussed in turn.

The syslog message generator 401 is implemented as a service, application, or software instructions as a means for generating or trapping syslog messages. The syslog message generator 401 processes on a network-enabled device, such as the network device 301 of the apparatus 300 of FIG. 3.

The sequencer 402 is also implemented as a service, application, or software instructions as a means for maintaining a dual set of different sequence numbers for each syslog message produced or communicated by the syslog message generator 401. The dual set of different sequence numbers includes a first sequence number and a second sequence number.

The first sequence number is maintained as a changing total count for received syslog messages. A value for the first sequence number is assigned to a syslog message being processed and then the first sequence number is incremented from the next syslog message to be processed. The first sequence number acts as universal identifier for each syslog message processed.

The second sequence number is maintained as a changing total count for selective syslog messages that are associated with a given session. That is, the second sequence number is incremented when a syslog message associated with a session to which the second sequence number is assigned is received and processed by the syslog message generator 401.

The first and second sequence numbers are associated with each syslog message received. The value of the first sequence number does not vary across the sessions, whereas values for the second sequence numbers do vary across different sessions.

In some cases, the syslog sequencing system 400 may also include a deliver 403. The deliver 403 is implemented as software, applications, or services as a means for transferring or forwarding a syslog message to recipients over a session to which the recipients are registered or assigned. The delivered syslog messages include the first and second sequence numbers, which are generated and managed by the sequencer 402.

According to an embodiment, the syslog sequencing system 400 can also include a filter manager 404 and/or a rate limit manager 403. The filter manager 404 and the rate limit manager 403 are implemented as services, software, or applications as a means for rate limiting or message filtering syslog messages to recipients. That is, rate limits and message filters may be applied on a global basis with respect to the syslog message generator 401, on a session specific basis, on a message specific basis, and/or on a recipient specific basis.

The syslog sequencing system 400 may also include a session manager 406. The session manager 406 is implemented as software, applications, or services as a means for associated multiple and different transport connections with a same session or as a means for associating a same syslog message with two different sessions.

It is now understood how syslog messages may be dual sequenced for purposes of maintaining identity with respect to all syslog messages and identity within a given session. This can improve processing of recipients that rely on syslog messages by providing more reliable information about a particular syslog message and its relationship to a session and to all syslog messages.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method implemented in a non-transitory machine-accessible medium for executing on a machine, comprising:
   generating, by the machine, a system log(syslog) message with a producer identity tied to a recipient identity for a recipient;
   identifying, by the machine, the recipient to receive the syslog message based on the recipient identity that is tied to receiving the syslog message based on a type, category, or classification assigned to the syslog message;
   sequencing, by the machine, the syslog message with a global sequence number and with a session sequence number that is specific to a session associated with the recipient, the sequencing providing a dual-identification scheme for the syslog message where the global sequence number is an absolute identifier and the session sequence number is a relative identifier for a specific session, and filtering is done on the syslog message based on the global sequence number, the session sequence number, the syslog message, and the recipient identity, the recipient is unaware of the filtering and any dropped message because the sequencing for the syslog message has no gap in the session sequence number even when the dropped messages occur as a result of the filtering; and
   forwarding, by the machine, the syslog message, the global sequence number and the session sequence number to the recipient, the global sequence number and the session sequence number carried in a separate data structure from the syslog message.

2. The method of claim 1 further comprising, enforcing, by the machine, a recipient defined rate limit during the forwarding.

3. The method of claim 1 further comprising, enforcing, by the machine, a recipient defined message filter during the forwarding.

4. The method of claim 1 further comprising:
   identifying, by the machine, other recipients associated with the session; and
   forwarding, by the machine, the syslog message, the global sequence number, and the session sequence number to the other recipients.

5. The method of claim 1 further comprising:
   identifying, by the machine, a different recipient to receive the syslog message and associated with a different session;
   sequencing, by the machine, the syslog message with a different session sequence number for the different session; and
   forwarding, by the machine, the syslog message, the global sequence number, and the different session sequence number to the different recipient.

6. The method of claim 1, wherein sequencing further includes:
   maintaining a global counter that is incremented when each new syslog message is generated and representing a global sequence number as the global counter; and
   maintaining a session counter that is incremented when a session specific message is produced and representing the session sequence number as the session counter.

7. The method of claim 1 further comprising:
   buffering, by the machine, the syslog message, the global sequence number, and the session sequence number if the forwarding fails; and
   re-processing, by the machine, the forwarding from a buffer when a connection is re-established with the recipient.

8. A non-transitory machine-accessible medium having instructions embedded thereon, the instructions when accessed by a machine perform the method of:
   trapping, by the machine, system log (syslog) messages and inspecting, by the machine, the syslog messages to associate the syslog messages to categories and classifications;
   identifying, by the machine, recipients and sessions for each of the syslog messages and associating configurations and policies on a per recipient basis or a per session basis, each syslog message having a producer identity that ties to a specific recipient identity for one or the recipients, the specific recipient identity associated with the producer identity to ensure any syslog messages coming from a particular producer having the producer identity is sent to the specific recipient identity;
   maintaining, by the machine, a global sequence number for the syslog messages and session specific sequence numbers for select ones of the syslog messages and the sessions the global sequence number having a dual-identification scheme for the syslog messages where the global sequence number is an absolute identifier and a session sequence number that is a relative identifier for a specific session, and filtering is done on the syslog messages based on the global sequence number, the session sequence number, the syslog message and recipient identities, a particular recipient is unaware of the filtering and any dropped message because the sequencing for the syslog messages has no gap in the session sequence number even when the dropped messages occur as a result of the filtering; and delivering, by the machine, select ones of the syslog messages to recipients of the sessions to which the select ones belong along with the global sequence number and the corresponding session specific sequence numbers.

9. The medium of claim 8 further comprising, maintaining, by the machine, a different counter for the global sequence number and for each of the session specific sequence numbers.

10. The medium of claim 9 further comprising, incrementing, by the machine, a global counter for each syslog message trapped and selectively incrementing session specific counters for each identified one of the syslog messages that are associated with a specific one of the sessions.

11. The medium of claim 8, wherein maintaining further includes representing the session specific sequence numbers as values relative to the global sequence number.

12. The medium of claim 8 further comprising at least one of:
enforcing, by the machine, session specific rate limits for the syslog messages; and
enforcing, by the machine, session specific filters for the syslog messages.

13. The medium of claim 8 further comprising, managing, by the machine, a select one of the sessions across multiple and different transport connections associated with multiple ones of the recipients.

14. An apparatus, comprising:
a network device; and
system log (syslog) manager, the syslog manager is to process on the network device and is to generate or trap syslog messages, and the syslog manager is to associate selective ones of the syslog messages to one or more sessions and maintain session specific sequence numbers for each different session and maintain a global sequence number for each of the syslog messages generated or trapped, the syslog manager is to also classify the syslog messages and the syslog manager delivers select ones of the syslog messages, the global sequence number, and selective ones of the session specific sequence numbers to selective recipients in response to the sessions to which the select ones of the syslog messages belong, the global sequence number and the selective ones of the session specific sequence numbers maintained in a separate data structure from that which is associated with the selective ones of the syslog messages during delivery, each syslog message having a producer identity that ties to a specific recipient identity for a specific one or the selective recipients, the specific recipient identity associated with the producer identity for a particular principal to ensure any syslog messages generated by the particular principal is sent and tied to the specific recipient identity for a specific recipient global sequencing number providing a dual-identification scheme for the syslog messages where the global sequence number is an absolute identifier and a session sequence number is a relative identifier for a specific session, and filtering is done on the syslog messages based on the global sequence number, the session sequence number, the syslog message, and recipient identities, a particular recipient is unaware of the filtering and any dropped message because the sequencing for the syslog messages has no gap in the session sequence number even when the dropped messages occur as a result of the filtering.

15. The apparatus of claim 14, wherein the network device is a network router.

16. The apparatus of claim 14, wherein the syslog manager is to enforce at least one of rate limiting and filtering for the syslog messages in response to session specific configurations.

17. The apparatus of claim 14, wherein the syslog manager is to buffer syslog messages, the global sequence number, and the session specific sequence numbers for subsequent delivery to the selective recipients if connection failures are detected during a transfer to the selective recipients.

18. The apparatus of claim 14, wherein the syslog manager maintains the session specific numbers as values that are relative to the global sequence number.

19. The apparatus of claim 14, wherein the syslog manager maintains one of the sessions for multiple ones of the recipients over multiple different transport connections.

* * * * *

UNITED STATES PATENT AND TRADEMARK OFFICE
CERTIFICATE OF CORRECTION

PATENT NO.        : 8,260,908 B2
APPLICATION NO.   : 11/280539
DATED             : September 4, 2012
INVENTOR(S)       : Chang et al.

Page 1 of 1

It is certified that error appears in the above-identified patent and that said Letters Patent is hereby corrected as shown below:

In column 10, line 59, in claim 8, after "sessions", insert --,--, therefor

In column 10, line 65, in claim 8, after "message", insert --,--, therefor

In column 12, line 12, in claim 14, after "recipient" second occurrence, insert --, a--, therefor Signed and Sealed this
First Day of January, 2013

David J. Kappos
*Director of the United States Patent and Trademark Office*